United States Patent
Dao et al.

(10) Patent No.: US 10,846,054 B2
(45) Date of Patent: Nov. 24, 2020

(54) UNDERFLOW/OVERFLOW DETECTION PRIOR TO NORMALIZATION

(71) Applicant: International Business Machines Corporation, Armonk, NY (US)

(72) Inventors: Son T. Dao, Stuttgart (DE); Silvia Melitta Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 14/573,273

(22) Filed: Dec. 17, 2014

(65) Prior Publication Data

US 2015/0378679 A1 Dec. 31, 2015

Related U.S. Application Data

(63) Continuation of application No. 14/317,413, filed on Jun. 27, 2014.

(51) Int. Cl.
*G06F 7/485* (2006.01)
*G06F 7/499* (2006.01)
*G06F 5/01* (2006.01)

(52) U.S. Cl.
CPC ............. *G06F 7/485* (2013.01); *G06F 5/012* (2013.01); *G06F 7/49915* (2013.01)

(58) Field of Classification Search
CPC .......................... G06F 7/4991; G06F 7/49915
See application file for complete search history.

(56) References Cited

U.S. PATENT DOCUMENTS

| | | | | |
|---|---|---|---|---|
| 5,027,308 A | * | 6/1991 | Sit | G06F 7/485 708/205 |
| 5,687,359 A | * | 11/1997 | Smith, Sr. | G06F 9/30025 708/495 |
| 5,805,475 A | * | 9/1998 | Putrino | G06F 7/483 708/204 |
| 5,844,827 A | * | 12/1998 | Wong | G06F 5/01 708/205 |
| 6,212,539 B1 | * | 4/2001 | Huck | G06F 7/768 708/495 |
| 6,779,013 B2 | | 8/2004 | Pangal | |
| 8,126,954 B2 | | 2/2012 | Cornea-Hasegan | |
| 8,352,531 B2 | | 1/2013 | Boersma et al. | |
| 2013/0212139 A1 | * | 8/2013 | Gschwind | G06F 7/483 708/204 |

(Continued)

OTHER PUBLICATIONS

Wikipedia, Computer, Jun. 14, 2013, pp. 1-14.

(Continued)

*Primary Examiner* — Andrew Caldwell
*Assistant Examiner* — Emily E Larocque
(74) *Attorney, Agent, or Firm* — David B. Woycechowsky

(57) ABSTRACT

Methods and apparatuses for generating a condition code for a floating point number operation prior to normalization. A processor receives an intermediate result for an operation, wherein the intermediate result comprises an intermediate significand and an intermediate exponent. A processor determines a mask based on the value of the intermediate exponent. A processor generates a masked significand by applying the mask to the intermediate significand. A processor generates a condition code based on the masked significand having a predetermined value.

9 Claims, 5 Drawing Sheets

(56) References Cited

U.S. PATENT DOCUMENTS

2014/0006467 A1    1/2014   Samudrala et al.
2014/0067894 A1    3/2014   Plondke et al.
2014/0379773 A1*  12/2014   Rubanovich ............ G06F 7/483
                                                         708/501

OTHER PUBLICATIONS

Al-Ashrafy et al., "An Efficient Implementation of Floating Point Multiplier", 978-1-4577-0069-9/11/, ©2011 IEEE.
Minchola et al., "A FPGA IEEE-754-2008 DECIMAL64 Floating-Point Adder/Subtractor", pp. 251-256, 978-1-4244-8848-3/11/, ©2011 IEEE.
"Underflow/Overflow Detection Prior to Normalization", U.S. Appl. No. 14/317,413, filed Jun. 27, 2014.
IBM Appendix P, list of IBM patents or patent applications treated as related, Dec. 17, 2014.

* cited by examiner

UNDERFLOW/OVERFLOW DETECTION PRIOR TO NORMALIZATION

BACKGROUND OF THE INVENTION

The present invention relates generally to the field of floating point processing, and more particularly to determining overflow/underflow conditions.

Floating point numbers may be used to represent a large range of numbers using a limited number of bits. Floating point numbers act as if there is no fixed number of bits before or after the decimal point; that is, the decimal point can float. Floating point numbers are represented by a number value and an exponent associated with that number value. Due to the added complexity of handling both a value and an exponent when performing calculations with floating point numbers, some processors comprise floating point processors. Floating point processors are specialized processors designed for performing floating point arithmetic, such as addition, subtraction, multiplication, division, bit shifting and other operations. While floating point numbers typically have larger ranges than integer number, the representations of floating point numbers still have limits based on the amount of storage used to store the representation. The limits of a floating point numbers representation are based primarily on the range of exponents that can be stored. When the exponent falls outside this range underflow or overflow occurs.

Underflow is a condition where a number is less than the smallest number a given floating point number can represent. Overflow is a condition where a number is greater than the largest number a given floating point number can represent. Due to floating point numbers having a limited amount of storage, either condition occurs when a number falls outside the range the representation of the floating point number permits. Floating point numbers benefit from larger ranges than integer numbers due to the exponent value of the floating point numbers. The exponent value allows a decimal point to "float" or shift based on the magnitude of a particular number. When the exponent value is outside the range of values a particular representation allows, an underflow or overflow condition will occur.

SUMMARY

Embodiments of the present invention provide a method, program product and apparatus for generating a condition code for a floating point number operation prior to normalization. A processor receives an intermediate result for an operation, wherein the intermediate result comprises an intermediate significand and an intermediate exponent. A processor determines a mask based on the value of the intermediate exponent. A processor generates a masked significand by applying the mask to the intermediate significand. A processor generates a condition code based on the masked significand having a predetermined value.

DETAILED DESCRIPTION

Figure 1:
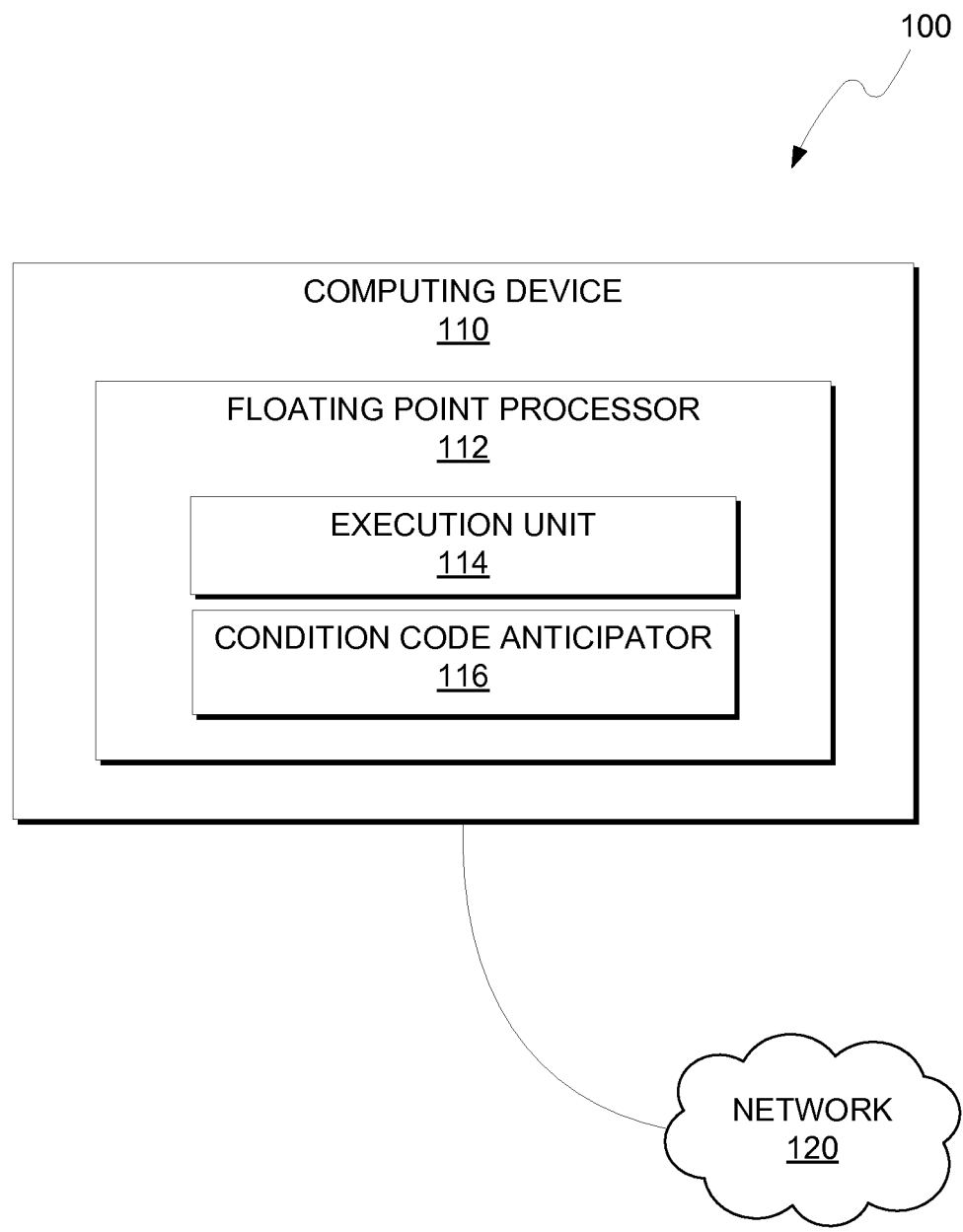
FIG. 1 is a functional block diagram illustrating a computing environment with a floating point processor, in accordance with an exemplary embodiment of the present invention.

Embodiments of the present invention recognize that detecting overflow or underflow conditions quickly can increase processing speed. As such, detecting the exceptions that underflow or overflow conditions represent can be handled earlier by the processor or computer performing floating point calculations. A typical operation performed on floating point number calculations is the process of normalization. Normalization is the process of correcting a floating point number such that the floating point number does not have any leading zeroes stored in the representation. Normalization allows for increased precision in storing in the floating point number by removing the leading zeroes. In some cases, normalization creates conditions where a floating point number is outside the range of valid values. The range of valid values is based on the finite number of digits or bits stored (e.g. the precision of the floating point number). When an exponent falls outside this range, an overflow or underflow condition is raised by the processor or computer and the error must be corrected, typically by rounding or truncation of the number. Normalization is performed by shifting a radix point of floating point number such that no leading zeroes are present. Embodiments of the present invention recognize that the shifting operation is a time consuming operation. Embodiments of the present invention recognize that anticipating normalization will introduce overflow or underflow conditions and may improve processing time. In embodiments of the present invention, the processor can use an anticipated condition to resolve the overflow or underflow that will occur without performing the time consuming step of normalization.

A floating point number is a representation of a real number in scientific notation. The representation of a real number as a floating point number may include the following information:

$$(-1)^{sign} * significand * base^{exponent}$$

In the above representation, a sign, significand, base and exponent represent a real number (e.g. 519.42) in a floating point format (e.g. $5.1942 \times 10^2$). The sign represents the direction in a number line the real number is in relation to zero (e.g. positive or negative value), where the sign variable in the above equation is represented by either a "0" or a "1" based on the represented number being either positive or negative, respectively. The significand or mantissa represents the significant digits of the real number (e.g. 51942). The base or radix represents the number of unique digits used to represent real numbers (e.g. ten for decimal numbers or two for binary numbers). The exponent or magnitude represents the position of the decimal or radix point in the real number (e.g. an exponent of two moves the radix point two place to the right). Floating point numbers allow for representations of a larger range of values using fewer digits (e.g. 6,874,000,000 versus $6.874 \times 10^9$), by moving or floating the radix point.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating a computing environment with a floating point processor, generally designated 100, in accordance with one embodiment of the present invention. Computing environment 100 includes a computing device 110 connected over network 120. Computing device 110 includes a floating point processor 112. Floating point processor 112 contains circuit logic for execution unit 114 and condition code anticipator 116.

In various embodiments of the present invention, computing device 110 is a computing device that can, for example, be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to floating point processor 112 and is capable of executing execution unit 114 and condition code anticipator 116. Computing device 110 may include internal and external hardware components, as depicted and described in further detail with respect to FIG. 5. In some embodiments, floating point processor 112 is a component of computer processor(s) 504. In other embodiments, floating point processor 112 is a separate component of computing device 110.

In this exemplary embodiment, execution unit 114 and condition code anticipator 116 are stored on floating point processor 112. However, in other embodiments, execution unit 114 and/or condition code anticipator 116 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 110 and other devices (not shown), in accordance with embodiments of the present invention.

In exemplary embodiments, computing device 110 includes floating point processor 112. Floating point processor 112 performs arithmetic and logic operations on floating point numbers. Computing device 110 stores the representation of a floating point number in memory 506 or persistent storage 508, as discussed in FIG. 5. In some embodiments, the representation may include the sign, significand and exponent. In some embodiments, the base is omitted in the representation when stored on computing device 110 due to the standardization of the representation on said computing device 110 (e.g. a certain representation is designed with a specific base to be used such as binary with base 2, decimal with base 10 or hexadecimal with base 16). Computing device 110 stores the representation of a floating point number with a finite precision of digits such as bits. The significand and exponent are allocated a certain amount of digits. Due to the finite amount of storage a floating number representation may be allocated, computing device 110 can store only a predetermined range of real numbers for a given floating point representation. As such, floating point processor 112 may only perform operations with floating point numbers and produce results within this range. The range is based on the number of digits or bits both the significand and the exponent is allocated. The number of digits or bits for the exponent is the primary component that determines the size of this range. For example, if an exponent is allocated eight bits, then a valid range would be approximately $2^{-127}$ to $2^{128}$. If the value for the exponent falls outside of the range, it may not be able to be represented in a given floating point number representation. For example, a floating point number may be represented with the following format:

| Component | Sign | Exponent | Significand |
|---|---|---|---|
| Bit Position | 0 | 1... ...7 | 8... ...31 |

In the above example, thirty-two bits are used to represent a floating point number. One bit (e.g. bit position 0) represents the sign component of a floating point number (i.e. positive or negative). Seven bits (e.g. bit positions 1-7) represent the exponent component of the floating point number and provides a resolution of 128 values (0 to 127) the exponent can represent. In some embodiments, an offset or bias is associated with the exponent to provide a range of both positive and negative exponents. For example, a bias of 64 may be used to subtract from the bit value to generate a range of 63 to −64, versus the stored 127 to 0. In other embodiments, the exponent value is encoded in a representation that includes negative values within the bits used to represent the exponent (e.g. two's complement or an extra sign bit). In the above example for a representation of a floating point number, 24 bits (e.g. bit positions 8-31) represent the significand of the floating point. The first bit or left most bit of the significand (bit position 8) represents the most significant bit. The last bit or right most bit of the significand (bit position 31) represents to least significant bit. The most significant bit and least significant bit represent an ordering of the significand. For example, the bits starting from the most significant bit have a larger component value (e.g. 128) of the represented value than the following bits or the least significant bit (e.g. 1).

Floating point processor 112 includes execution unit 114 and condition code anticipator 116. Execution unit 114 performs instructions or operations and generates a result or resultant based on the instructions. Floating point processor 112 receives instructions from computing device 110 to perform arithmetic and logic operations on one or more operands. For example, floating point processor receives a request to add two operands denoted A and B. Based on the received instruction, floating point processor 112 sends the received operands to execution unit 114 to perform the instruction. Execution unit 114 perform the requested instruction (e.g., add) using the received operands (e.g., A and B). Execution unit 114 generate a resultant (e.g., C) or value based on the received instruction or operation (e.g. C=A+B) when performed using the one or more operands. In some embodiments, execution unit 114 is configured or programmed to perform a single operation or instruction. In other embodiments, execution unit 114 is configured or programmed to perform a multiple operations or instructions.

Based on the resultant, execution unit 114 may also generate a condition code. A condition code includes flags or other representations that the resultant generated by execution unit 114 may include errors or exceptions when performing an operation. Examples of conditions that a condition code may represent include, but are not limited to, an overflow or underflow condition. An overflow condition occurs in a floating point number when the exponent of the floating point number exceeds the value that the representation of the exponent in computing device 110 is cable of storing the floating point number. An underflow condition occurs when the exponent becomes smaller than the value that the representation of the exponent in computing device 110 is capable of storing the floating point number.

As an example, floating point processor 112 receives an instruction from computing device 110 to perform the operation of subtracting one number from a second number. The instruction may be represented as SUBTRACT A, B, where SUBTRACT is the operation and A and B are operands. In this specific example, A is equal to $0.0224 \times 10^2$ and B is equal to $0.0022 \times 10^3$. Floating point processor 112 sends the operands to execution unit 114 to perform the SUBTRACT instruction. Execution unit 114, based on the received instruction SUBTRACT, aligns both operands' exponents such that the exponents are equal in magnitude. In this example, execution unit 114 aligns operand A to operand B, such that operand A becomes $0.00224 \times 10^3$. Execution unit 114 generates an intermediate result of the instruction based on the aligned operands. The intermediates result comprises an intermediate significand and intermediate exponent. In this example, the intermediate result of A-B ($0.00224 \times 10^3 - 0.0022 \times 10^3$) is equal to $0.00004 \times 10^3$, wherein 0.00004 is the intermediate significand and 3 is the intermediate exponent. In embodiments of the present invention, execution unit 114 detects if any leading zeroes are present in the intermediate result. In this example, execution unit 114 detects four leading zeroes in the intermediate result of $0.00004 \times 10^3$. Based on the number of leading zeroes, execution unit 114 normalizes the significand of the intermediate result by shifting the significand according to the number of detected leading zeroes (e.g., 0.00004 becomes 0.4000). Execution unit 114 adjusts the exponent of the intermediate result based on the number of digits, in this example the number of bits, the significand of the intermediate result has been shifted to perform the normalization. In this example, the exponent of the intermediate result is equal to 3 and the shift amount is equal to 4, based on the determined four leading zeroes prior to normalization. The normalized exponent is equal to (3-4) or (−1). In embodiments of the present invention, the negative exponent indicates underflow and execution unit 114 will return the normalized result (e.g. $0.4000 \times 10^{-1}$) to floating point processor 112. Execution unit 114 returns a condition code indicating the requested operation has generated an underflow condition. Below, in Table 1, is a summary of the steps performed by execution unit 114 for the described example.

TABLE 1

| Operation: | SUBTRACT (A − B) |
|---|---|
| Operands: | A = $0.0224 \times 10^2$ |
|  | B = $0.0022 \times 10^3$ |
| Alignment: | Larger exponent selected for alignment - $10^3$ selected |
|  | A = $0.00224 \times 10^3$ - Aligned to $10^3$ exponent |
|  | B = $0.0022 \times 10^3$ |
| Intermediate Result: | $0.00224 \times 10^3$ |
|  | −$0.0022 \times 10^3$ |
|  |  |
|  | $0.00004 \times 10^3$ |
| Leading Zero Detection: | $0.00004 \times 10^3$ - 4 leading zeroes |
| Normalization: | 0.4000 |
| Exponent Correction: | 3-4 = (−1) |
| Final Result: | $0.4000 \times 10^{-1}$ - UNDERFLOW |

The following example illustrates the same operation but with a hexadecimal representation stored on computing device 110. It should be noted that the digits, while stored as bits, would maintain hexadecimal digit representation. For example, the intermediate result is $0.0003 \times 16^2$. The digit "3" in hexadecimal is equivalent to 0011 in binary. However, during normalization the first two zero bits of 0011 are not shifted during normalization in order to maintain the representation of the intermediate result in hexadecimal. As such, execution unit 114 handles the bits as they would be stored in computing device 110 as hexadecimal digits when performing normalization. If the representation is in decimal, the decimal digits could be stored in computing device 110 as binary coded decimal numbers or BCD. In such an example, execution unit 114 still performs normalization on the digit level, not necessarily the bit level. For example, 4, in decimal, is equal to "0100" in BCD. Even though there is a leading zero in the binary representation, since execution unit 114 is designed to handle BCD, as in the above example, the leading bit in that digit will remain zero. Below, in Table 2, is an example for performing a similar subtraction operation in hexadecimal:

TABLE 2

| Operation: | SUBTRACT (A − B) |
|---|---|
| Operands: | A = $0.B3C2 \times 16^2$ |
|  | B = $0.B3BF \times 16^2$ |
| Alignment: | Larger exponent selected for alignment - No Alignment |
|  | A = $0.B3C2 \times 16^2$ |
|  | B = $0.B3BF \times 16^2$ - Exponents are equal |
| Intermediate Result: | $0.B3C2 \times 16^2$ |
|  | −$0.B3BF \times 16^2$ |
|  | $0.0003 \times 16^2$ |
| Leading Zero Detection: | $0.0003 \times 16^2$ - 3 leading zeroes |
| Normalization: | 0.3000 |
| Exponent Correction: | (2-3) = (−1) - UNDERFLOW |

In exemplary embodiments, execution unit 114 operates with a precision for the significand larger than the stored representation of computing device 110. Execution unit 114 stores the extra bits while performing an operation or instruction. For example if a significand is stored in computing device 110 with 24 bits of precision, then execution unit may store an additional 32 rounding bits. Rounding bits are also referred to as guard bits or sticky bits. Rounding bits are additional bits produced by an operation that are used to round to intermediate result prior to storage. A guard bit is typically the most significant bit in the rounding bits. Sticky bits are any subsequent lesser significant bits that may have been determined in an operation. Based on a chosen rounding method, executing unit 114 approximates the intermediate result based on the value of the rounding bits in order to account for any errors in calculation that produce more bits than the final stored representation in computing device 110 allows. For example, if executing unit 114 performs a conversion of a floating point number with a larger significand precision than another smaller significand precision (e.g. more bits allocated for the significand than another representation, such as 53 bits of precision for a significand to 24 bits of precision), then execution unit 114 determines the value of the least significant bit of the new 24 bit significand based on the rounding bits. In such an example, the rounding bits would contain the additional bits of the original 53 bit significand that were not able to be stored into the new conversion (e.g. 24 bit significand).

Execution unit 114 also includes condition code anticipator 116. For an instruction or operation performed by execution unit 114, condition code anticipator 116 determines if a condition code may occur prior to normalization performed by execution unit 114. A condition code is an exception produced by floating point processor 112 when an operation produces an error, such as exponent underflow or overflow. Condition code anticipator 116 receives the intermediate result from execution unit 114. Based on the exponent of the intermediate result, condition code anticipator 116 generates a mask to evaluate the significand of the intermediate result. A mask is a series of bits that passes through the value of certain bits of the significand (e.g. maintain or keep the bit value of the significand). The mask also forces or overwrites other bits to be certain value (e.g. make the bit value be either "1" or "0" regardless of the significand bit value). For example, a mask may pass through some bits of the significand, keeping the value the same as the significand, and overwrite other bits to be a "1", changing the value to "1" regardless of the bit value of the significand. In some embodiments, condition code anticipator 116 operates separately from the execution unit 114. Condition code anticipator 116 receives an indication of the operation performed by execution unit 114. Condition code anticipator 116 generates a mask based on both the operation performed by execution unit 114 and the exponent of the intermediate result generated by execution unit 114. In other embodiments, execution unit 114 includes condition code anticipator 116 for the operations performed by execution unit 114. In such embodiments, condition code anticipator 116 generates a mask based on the exponent of the intermediate result generated by execution unit 114.

In exemplary embodiments, condition code anticipator 116 generates a masked significand of the significand of the intermediate result. A masked significand is the intermediate significand evaluated on a digit-by-digit basis for a maximum value (e.g. a "1" for binary or F for hexadecimal) or a minimum value (e.g. a "0" for both binary and hexadecimal). Condition code anticipator 116 evaluates the masked significand. For operations that may generate an underflow condition (e.g. a subtraction operation), condition code anticipator 116 evaluates a number of most significant bits of the significand based on the value of the exponent of the intermediate result. In some embodiments, condition code anticipator 116 also evaluates a predetermined number of rounding bits. Condition code anticipator 116 evaluates the most significant bits for the presence of zero values for all of the evaluated bits. For example, if the exponent value of the intermediate result is equal to three, then the four most significant bits of the significand are evaluated to determine if the bits all have values equal to zero. Due to normalization, if all the evaluated bits are equal to zero (e.g. $0.00004 \times 10^3$) the normalized final result will shift four times and correct the exponent to be outside the valid range of the representation (e.g. $0.4000 \times 10^{-1}$). As another example, if a digit is a non-zero value, for the bits to be evaluated, then normalization will not create an underflow condition (e.g. $0.00014 \times 10^3$ will be shifted three times due to three leading zeroes and result in a final result $0.1400 \times 10^0$). In embodiments where the exponent value exceeds the digits of the significand, condition code anticipator 116 evaluates the most significant rounding digits or bits.

For operations that may generate an overflow condition (e.g. converting a floating point number with a larger precision for the significand to a floating point number with a smaller precision for the significand), condition code anticipator 116 evaluates a number least significant bits of the significand based on the value of the exponent of the intermediate result. Condition code anticipator 116 also evaluates a predetermined number of rounding bits based on the total number of digits of the final resultant's floating point number representation. For example, if the exponent value of the intermediate result is equal to 60 and the floating point representation has a maximum exponent of 127, then the seven least significant digits of the significand are evaluated to determine if the bits all have maximum digit values (e.g. 1 for binary F for hexadecimal). If the final resultant has six digits of precision for the significand, then the final resultant will be rounded and create an overflow condition when normalized.

Figure 2:
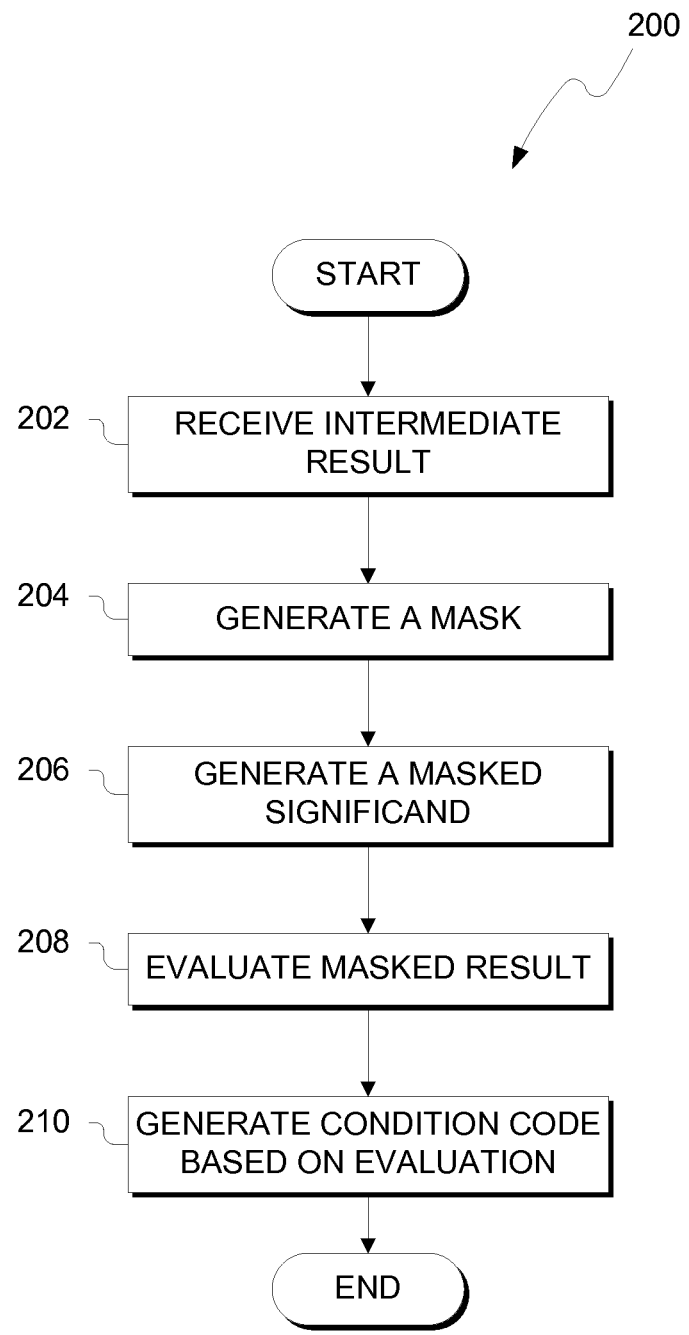
FIG. 2 illustrates operational processes of generating a condition code, on a computing device within the environment of FIG. 1, in accordance with an exemplary embodiment of the present invention.

FIG. 2, is a flowchart illustrating operational processes, generally designated 200, of condition code anticipator 116, executing on computing device 110, in accordance with an embodiment.

In process 202, condition code anticipator 116 receives an intermediate result from execution unit 114. The intermediate result is a result of an operation requested of execution unit 114 prior to normalization. The intermediate result comprises an intermediate significand and an intermediate exponent. The intermediate significand is the significand of the intermediate result. The intermediate exponent is the exponent of the intermediate result. In some embodiments, condition code anticipator 116 receives rounding bits from execution unit 114.

In process 204, condition code anticipator 116 generates a mask based on the intermediate exponent's value. For underflow conditions, condition code anticipator 116 generates a mask to evaluate a number of the most significant bits of the intermediate significand for zero values. For overflow conditions, condition code anticipator 116 generates a mask to evaluate a number of the least significant bits of the intermediate significand for maximum digit values. In some embodiments, condition code anticipator 116 generates a mask to evaluate the least significant bits of the intermediate significand and at least one or more rounding bits received for zero values in underflow conditions or maximum digit values for overflow conditions.

In process 206, condition code anticipator 116 generates a masked significand. Condition code anticipator 116 applies the mask generated in process 204 to the intermediate significand to generate the masked significand. By applying the mask to the intermediate significand, condition code anticipator 116 only evaluates the bits or digits that will cause an underflow or overflow condition when the intermediate result is normalized.

In process 208, condition code anticipator 116 evaluates the masked significand. For underflow conditions, condition code anticipator 116 evaluates the masked significand to determine if all values in the masked significand are equal to zero. For overflow conditions, condition code anticipator 116 evaluates the masked significand to determine if all values in the masked significand are at maximum value for the digit.

In process 210, condition code anticipator 116 generates a condition code based on the evaluation performed in process 208. Condition code anticipator 116 determines if an underflow or overflow condition will be generated if the intermediate result is normalized. Based on the operation and the masked significand value, condition code anticipator 116 determines if an underflow or overflow condition will occur when the intermediate result is normalized. In some embodiments, condition code anticipator 116 generates a mask for any rounding bits and determines if all the values are at maximum value for the rounding bits in addition to the masked significand to determine an overflow condition.

Figure 3:
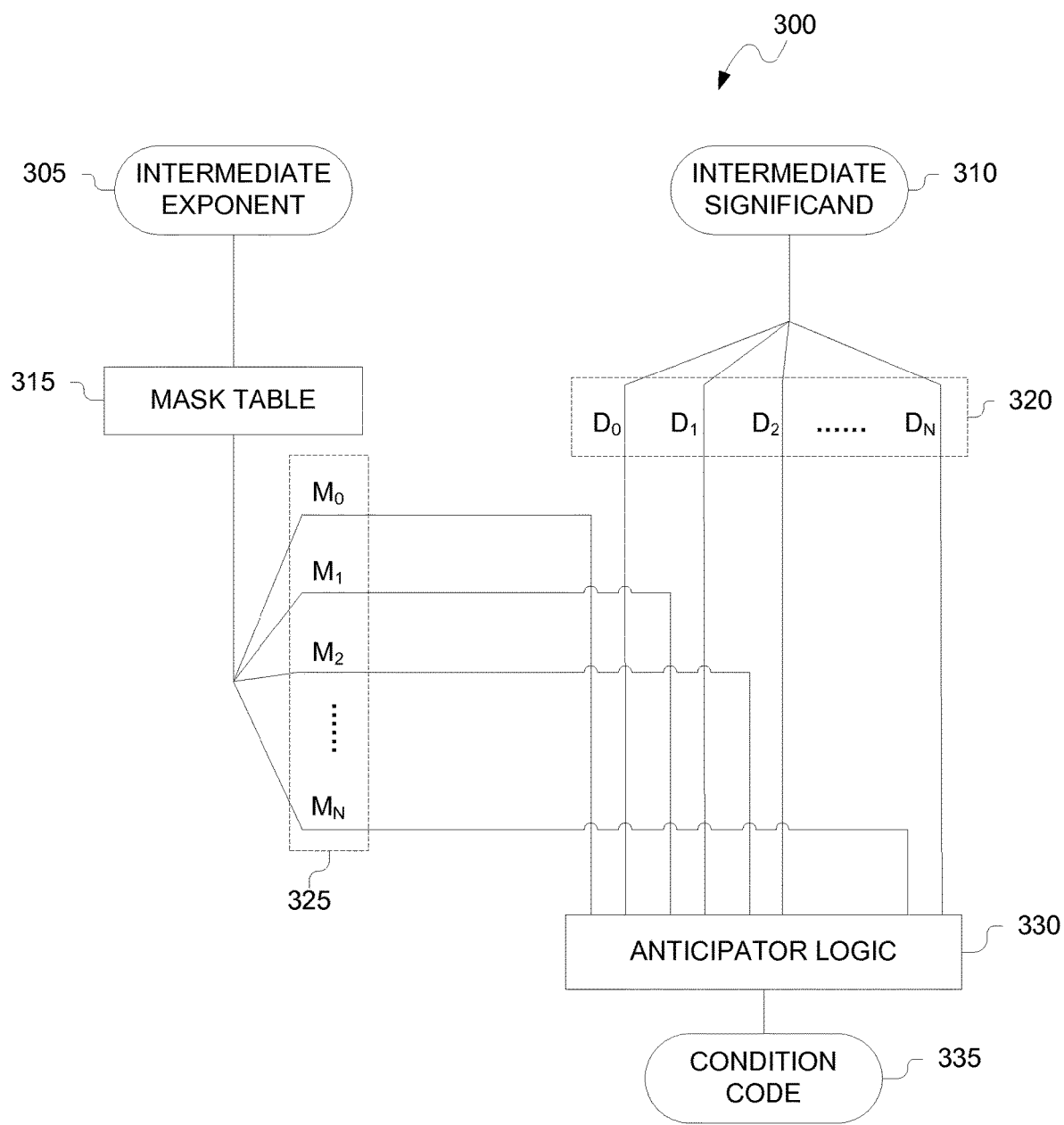
FIG. 3 illustrates example circuit logic of a condition code anticipator, in accordance with an exemplary embodiment of the present invention.

FIG. 3 illustrates example circuit logic 300, of condition code anticipator 116, in accordance with an exemplary embodiment of the present invention. Condition code anticipator 116 receives intermediate exponent 305 and intermediate significand 310. In embodiments where condition code anticipator 116 is a component of execution unit 114, condition code anticipator 116 may receive the intermediate result values from registers of execution unit 114. In embodiments which condition code anticipator 116 is separate from execution unit 114, condition code anticipator 116 may receive the intermediate result from communications fabric 502 of computing device 110. Condition code anticipator 116 may also receive the intermediate result from communication unit 510 of computing device 110. Intermediate significand 310 may also include any rounding bits generated in the intermediate result by execution unit 114.

Mask table 315 generates a mask vector 325 based on the exponent value of the intermediate exponent 305. In embodiments in which condition code anticipator 116 is a component of execution unit 114, condition code anticipator 116 stores a mask table associated with the operation performed by execution unit 114. In embodiments in which condition code anticipator 116 is separate from execution unit 114, condition code anticipator 116 stores multiple mask tables to account for the different operation performed by execution unit 114. In such embodiments, condition code anticipator 116 also receives an indication of the operation execution unit 114 is performing. The following is an example mask table, Table 3, for execution unit 114 performing an addition/subtraction operation. In Table 3, the operation is performed using hexadecimal floating point numbers for the operands. Also, the floating point numbers have seven bits of precision for the exponent and fourteen bits of precision for the significand and one rounding bit (creating a mask 15 bits long). Furthermore, the most significant bit of the significand corresponds to the left most bit of the mask below. The rounding bit is appended to the intermediate significand and becomes the least most significant bit, corresponding to the right most bit of the mask.

TABLE 3

| Exponent | Mask (MSB ...... LSB) |
| --- | --- |
| 0000000 | 011111111111111 |
| 0000001 | 001111111111111 |
| 0000010 | 000111111111111 |
| 0000011 | 000011111111111 |
| 0000100 | 000001111111111 |
| 0000101 | 000000111111111 |
| 0000110 | 000000011111111 |
| 0000111 | 000000001111111 |
| 0001000 | 000000000111111 |
| 0001001 | 000000000011111 |
| 0001010 | 000000000001111 |
| 0001011 | 000000000000111 |
| 0001100 | 000000000000011 |
| 0001101 | 000000000000001 |
| 0001110 | 000000000000000 |

In the above example, mask table 315 only has 15 entries. The entire range of exponents is not necessary to create the table because normalization of significands with an exponent above 15 or 0001110$_2$ will not result in an underflow condition. This is because the significand is 14 digits long with another digit for rounding (14+1=15). Due to normalization, if the intermediate exponent is equal to 14 and all 15 bits of the intermediate significand (including the rounding bit) are equal zero, then exponent underflow will occur. Therefore, the mask passes through all bit values of the significand for evaluation. As another example, if the intermediate exponent is equal to "0" if the first or most significant bit is equal to zero then exponent underflow will occur. Therefore, the mask passes through only the first of most significant bit of the significand for evaluation, forcing the remaining lesser significant bits to a "1" regardless of the significands value for said bits.

In addition, the above mask table applies to multiple floating point number representations (e.g. binary, hexadecimal, etc.). For example, the above mask table can apply to situations where the significand and rounding digits are either binary digits or hexadecimal digits. In the case where the floating point number representation is binary, the 15 bit mask is applied to each bit of the significand and the rounding bit, where the 14 most significant bits of the mask are applied to the significand and where the last or least significant bit of mask is applied to the rounding bit. In the case where the floating point number representation is hexadecimal, the 15 bit mask is applied to each digit of the significand and the rounding digit. In this case, the 14 hexadecimal digits of the significand are equal to 56 bits stored in the significand. However, the mask is applied to the hexadecimal digits, or groupings of four bits of the significand. Also in the example, the rounding digit is four bits wide and the last bit of the mask is evaluating the digit value.

Another example of mask table 315 is presented in Table 4 below. In this example, the operation is to convert a hexadecimal representation to a binary representation of a floating point number. The hexadecimal representation has 14 digits (or 56 bits) to represent the significand. The binary representation that a hexadecimal representation of a number is to be converted to has 24 bits to represent the significand. The loss of precision may cause overflow conditions if more digits of the hexadecimal representation of the number are at maximum digit values than the precision of the target binary conversion floating point number representation can store. For example, a hexadecimal number of 00FFFFFFFFFFFF$_{16}$ will cause an overflow condition when converted to binary due to the normalization that will occur (i.e. the two leading zero digits). The maximum digit values (i.e. F) of the hexadecimal number have a larger precision than the amount stored in the binary number (48 bits of maximum value digits versus the entire 24 bits of the binary number). Execution unit 114 will convert the excess bits to rounding bits to make the conversion and round the resultant based on the excess bits. In this example, the rounding bits will carry over to the significand. The carry-over from the rounding bits will cause the significand to overflow (e.g., FFFFFF for the significand will overflow when the rounding bits carryover an F). In this example, mask table 315 therefore evaluates both the least significant bits of the intermediate significand and the most significant bits rounding bit included in the intermediate significand.

TABLE 4

| Exponent | Mask (Significand) (MSB ... | Mask (Rounding Bits) ... LSB) |
| --- | --- | --- |
| 1100000 | 0000001111111 | 11111100000000 |
| 1100001 | 1000000111111 | 11111110000000 |
| 1100010 | 1100000011111 | 11111111000000 |
| 1100011 | 1110000001111 | 11111111100000 |
| 1100100 | 1111000000111 | 11111111110000 |
| 1100101 | 1111100000011 | 11111111111000 |
| 1100110 | 1111110000001 | 11111111111000 |
| 1100111 | 1111111000000 | 11111111111110 |

Mask vector 325 indicates which digits of the intermediate significand and any applicable rounding bits to evaluate based on the operation being performed and the value of intermediate exponent 305. Intermediate significand 310 is collected based on the floating point number representation to intermediate digit vector 320. For example, if the floating number representation is represented in binary digits, then each bit value of the intermediate significand 310 is equal to a digit of intermediate digit vector 320. As another example, if the floating number representation is represented in hexadecimal digits, then four-bit values of the intermediate significand 310 are grouped and equal to a digit of intermediate digit vector 320. Intermediate digit vector 320 may also include any rounding digits generated by execution unit 114.

Both mask vector 325 (where $M_0$ is the least significant bit of the mask and $M_N$ is the most significant bit) and intermediate digit vector 320 (where $D_0$ is the least significant bit of the mask and $D_N$ is the most significant bit) are evaluated by anticipator logic 330. Based on the operation performed by execution unit, anticipator logic 330 will combine mask vector 325 and intermediate digit vector 320 to determine if an underflow or overflow condition will occur when intermediate result 310 is normalized. Anticipator logic 330 sets condition code 335 based on the evaluation of mask vector 325 and intermediate digit vector 320, either indicating underflow, overflow or neither will occur if intermediate significand 310 is normalized.

Figure 4:
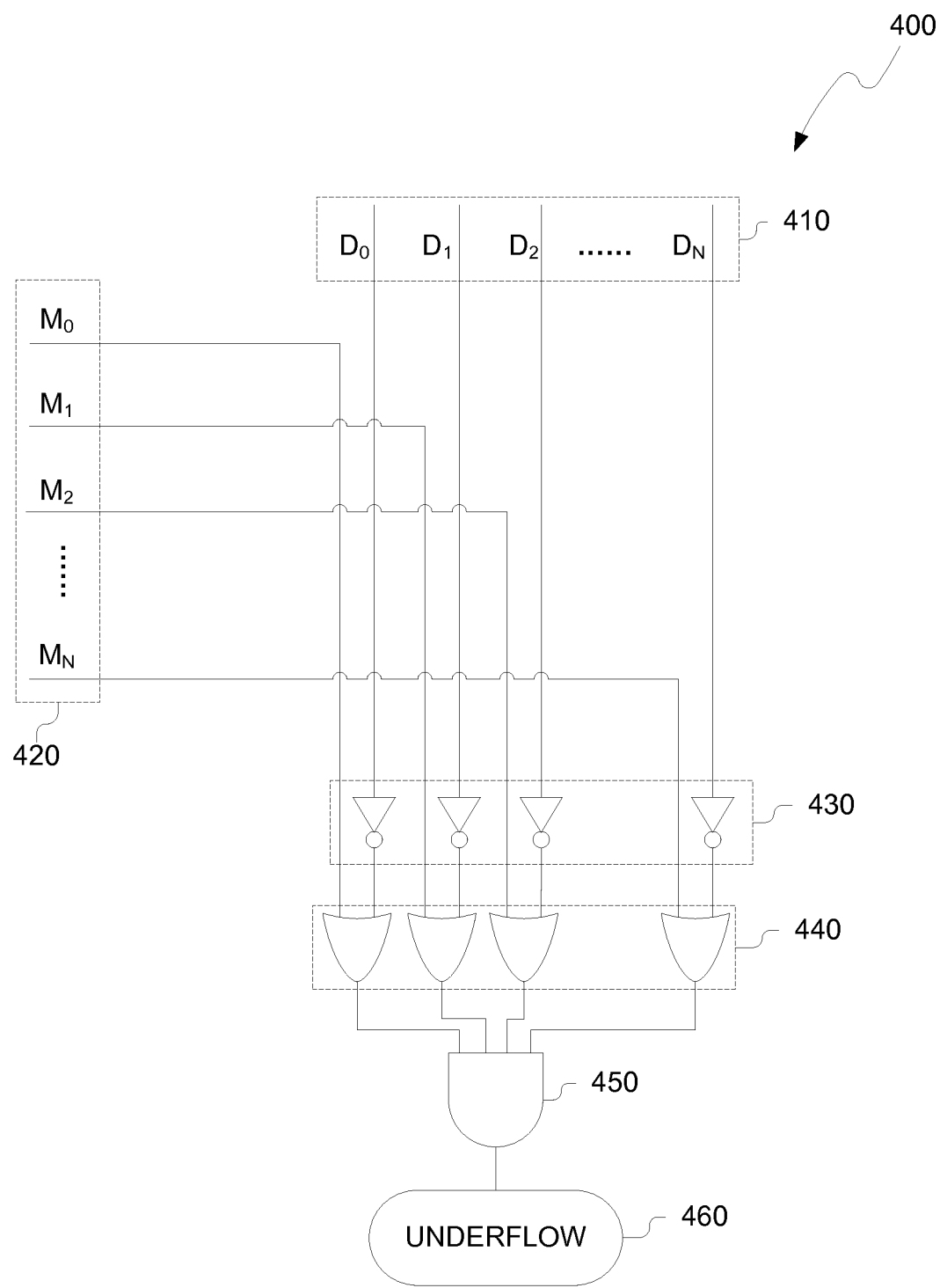
FIG. 4 illustrates example underflow anticipator logic for a subtraction operation, in accordance with an exemplary embodiment of the present invention.

FIG. 4 illustrates example underflow anticipator logic 400 for a subtraction operation, in accordance with an exemplary embodiment of the present invention. Underflow anticipator logic 400 determines an underflow condition for a subtraction operation and execution unit 114 is performing a subtraction operation between two operands. Underflow anticipator logic 400 receives intermediate subtraction digit vector 410 and subtraction mask vector 420. Intermediate subtraction digit vector 410 comprises the significand portion of the intermediate result generated by execution unit 114 in the process of performing a subtraction operation. Subtraction mask vector 420 comprises the determined mask of mask table 315 of condition code anticipator 116, based on the intermediate exponent generated by execution unit 114. Using the example table above describing the mask table for the subtraction operation, anticipator logic applies the mask to the intermediate significand by passing through bits with zero values of the significand where the corresponding bit value of the mask is equal to "0". Conversely, underflow anticipator logic 400 overwrites bit values of the significand to be equal to "1" where the corresponding bit value of the mask is equal to "1".

Underflow anticipator logic 400 determines if the bits of the intermediate significand are equal to zero. Underflow anticipator logic 400 inverts or flip the bits of the intermediate significand and a rounding bit represented by intermediate subtraction digit vector 410 with NOT gates 430 (where if a bit is equal to "0" a "1" is returned and if a bit is equal to "1" a "0" is returned). Underflow anticipator logic 400 applies subtraction mask vector 420 to the inverted intermediate subtraction digit vector 410 by bitwise OR gates 440. For digits not to be evaluated (e.g. a bit of subtraction mask vector 420 is equal to "1"), the resulted masked digit is equal to "1" regardless of its value. For digits to be evaluated for possible underflow conditions (e.g. a bit of subtraction mask vector 420 is equal to "0"), the inverted value is passed through. For example, if the bits is a zero (and is therefore inverted) an OR operation with "0" will pass through the value. Conversely, on OR operation with a "1" in subtraction mask vector 420 will overwrite the result to be "1". Bitwise OR gates 440 determines a vector of the same length as both the intermediate subtraction digit vector 410 and subtraction mask vector 420. Underflow anticipator logic 400 comprises vector-wide AND gate 450 which performs a AND operation to each bit of the vector determined by bitwise OR gates 440. If all values of the vector determined by bitwise OR gates 440 are equal to "1", then vector-wide AND gate 450 will set the underflow condition code 460 to be true. If any value of the vector determined by bitwise OR gates 440 are equal to "0", then no underflow condition is anticipated prior to normalization. Therefore underflow condition code 460 is set to false.

Figure 5:
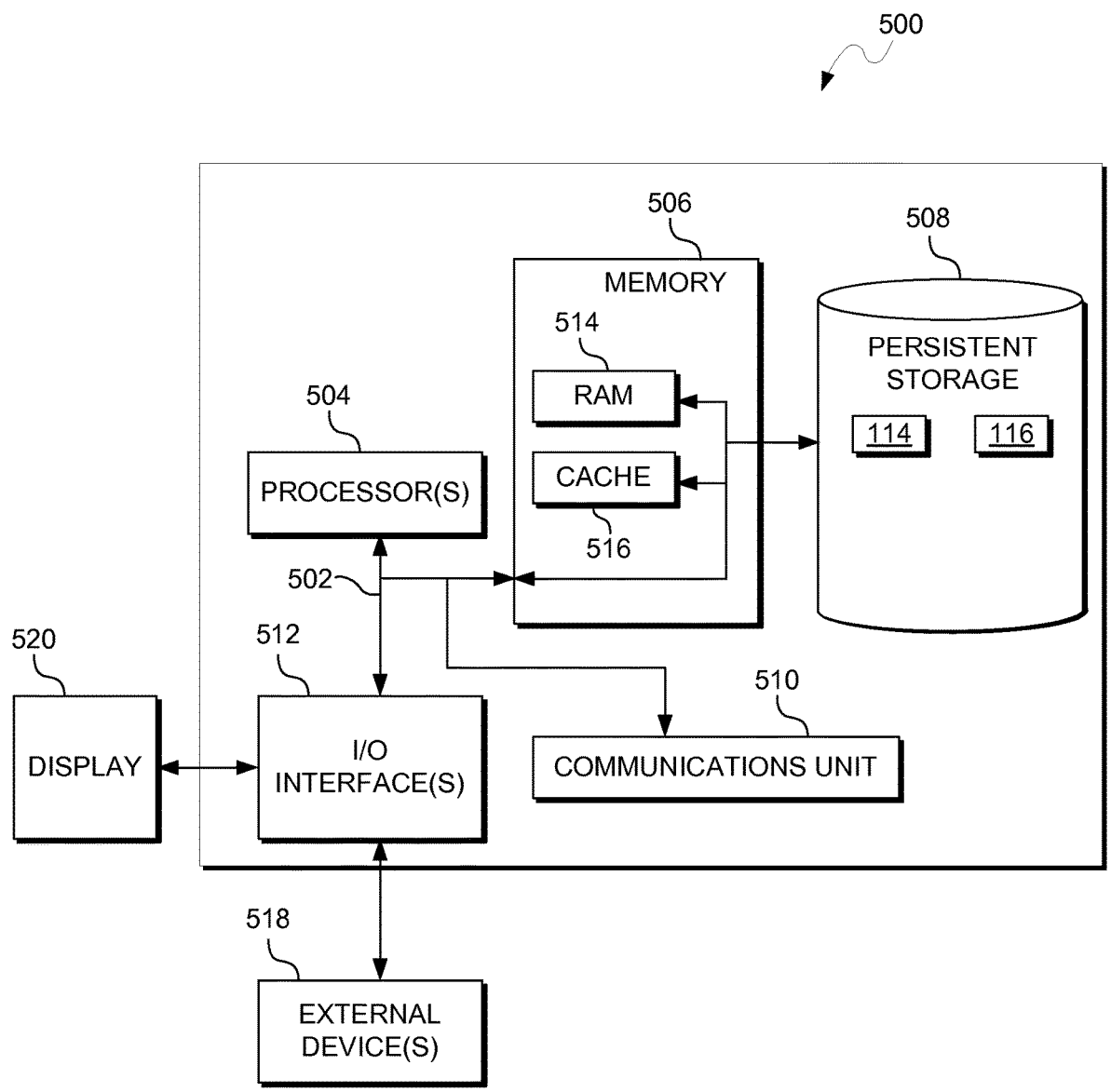
FIG. 5 depicts a block diagram of components of the computing device executing the method of FIG. 2, in accordance with an exemplary embodiment of the present invention.

FIG. 5 depicts a block diagram, 500, of components of computing device 110, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

In some embodiments, execution unit 114 and condition code anticipator 116 may be stored, respectively, in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information. In other embodiments, floating point processor 112, execution unit 114 and condition code anticipator 116 may be respectively implemented as modules of computing device 110 or processor(s) 504. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like. A module or a set of modules may also be implemented (in whole or in part) as a processor configured with software to perform the specified functionality. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. A module may also be embodied as a server with a service executing thereon.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 120. In these examples, communications unit 510 includes one or more network interface cards.

Communications unit 510 may provide communications through the use of either or both physical and wireless communications links. Floating point processor 112, execution unit 114 and condition code anticipator 116 may be, respectively, downloaded to persistent storage 508 through communications unit 510.

I/O interface(s) 512 allows for input and output of data with other devices that may be connected to computing device 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., floating point processor 112, execution unit 114 and condition code anticipator 116 can be respectively stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   receiving, by a set of processor(s), an intermediate result for an addition operation, with the intermediate result including an intermediate significand and an intermediate exponent;
   determining, by the processor(s) set, a mask based, at least in part, on the value of the intermediate exponent;
   applying, by the processor(s) set, the mask to the intermediate significand to obtain a masked significand; and
   generating, by the processor(s), an overflow condition code based, at least in part, a value of the masked significand.

2. The method of claim 1 wherein application of the mask to the intermediate significand includes:
   maintaining, by the mask, a bit values of a predetermined number of most significant bits of the intermediate significand in the masked significand; and
   overwriting, by the mask, a value of a predetermined number of least significant bits of the intermediate significand in the masked significand.

3. The method of claim 2 wherein the generation of the overflow condition includes determining that each of the predetermined number of least significant bits has a zero value.

4. A method comprising:
   receiving, by a set of processor(s), an intermediate result for an operation of converting an operand with a larger precision to a resultant with a smaller precision, with the intermediate result including an intermediate significand and an intermediate exponent;
   determining, by the processor(s) set, a mask based, at least in part, on the value of the intermediate exponent;
   applying, by the processor(s) set, the mask to the intermediate significand to obtain a masked significand; and
   generating, by the processor(s), an overflow condition code based, at least in part, a value of the masked significand.

5. The method of claim 4 wherein application of the mask to the intermediate significand includes:
   maintaining, by the mask, a bit values of a predetermined number of most significant bits of the intermediate significand in the masked significand; and
   overwriting, by the mask, a value of a predetermined number of least significant bits of the intermediate significand in the masked significand.

6. The method of claim 5 wherein the generation of the overflow condition includes determining that each of the predetermined number of least significant bits has a zero value.

7. A processor comprising hardware and firmware configure to perform at least the following operations:
   receiving, by a set of processor(s), an intermediate result for an addition operation, with the intermediate result including an intermediate significand and an intermediate exponent;
   determining, by the processor(s) set, a mask based, at least in part, on the value of the intermediate exponent;
   applying, by the processor(s) set, the mask to the intermediate significand to obtain a masked significand; and
   generating, by the processor(s), an overflow condition code based, at least in part, a value of the masked significand.

8. The processor of claim 7 wherein application of the mask to the intermediate significand includes:
   maintaining, by the mask, a bit values of a predetermined number of most significant bits of the intermediate significand in the masked significand; and
   overwriting, by the mask, a value of a predetermined number of least significant bits of the intermediate significand in the masked significand.

9. The processor of claim 8 wherein the generation of the overflow condition includes determining that each of the predetermined number of least significant bits has a zero value.

* * * * *